United States Patent
Verho et al.

(10) Patent No.: US 12,291,789 B2
(45) Date of Patent: May 6, 2025

(54) SYSTEM, ELECTRODE AND METHOD FOR EFFICIENT HYDROGEN GENERATION FROM WATER

(71) Applicant: HYENGEN AB, Stockholm (SE)

(72) Inventors: Oscar Verho, Stockholm (SE); Biswanath Das, Sundbyberg (SE); Bjorn Akermark, Saltsjobaden (SE); Joydeep Dutta, Vallingby (SE)

(73) Assignee: HYENGEN AB, Stockholm (SE)

( * ) Notice: Subject to any disclaimer, the term of this patent is extended or adjusted under 35 U.S.C. 154(b) by 0 days.

(21) Appl. No.: 18/711,644

(22) PCT Filed: Nov. 24, 2022

(86) PCT No.: PCT/SE2022/000009
§ 371 (c)(1),
(2) Date: May 20, 2024

(87) PCT Pub. No.: WO2023/096543
PCT Pub. Date: Jun. 1, 2023

(65) Prior Publication Data
US 2024/0328009 A1   Oct. 3, 2024

(30) Foreign Application Priority Data
Nov. 26, 2021   (SE) .................................... 2100177-1

(51) Int. Cl.
*C25B 11/069*   (2021.01)
*C25B 1/04*   (2021.01)
(Continued)

(52) U.S. Cl.
CPC .............. *C25B 11/069* (2021.01); *C25B 1/04* (2013.01); *C25B 11/056* (2021.01); *C25B 11/081* (2021.01); *C25B 15/02* (2013.01)

(58) Field of Classification Search
None
See application file for complete search history.

(56) References Cited

U.S. PATENT DOCUMENTS

2011/0042227 A1* 2/2011 Corbea ............... C07F 15/0053
205/639

FOREIGN PATENT DOCUMENTS

WO    2011142848 A2    11/2011
WO    2016079746 A1    5/2016

OTHER PUBLICATIONS

Pinczewska et al. (J. Am. Chem. Soc. 2012, 134, 18022-18033) (Year: 2012).*

(Continued)

*Primary Examiner* — Wojciech Haske
(74) *Attorney, Agent, or Firm* — Mark T. Vogelbacker; Eckert Seamans Cherin & Mellott, LLC

(57) ABSTRACT

An electrode and a system for electrochemical hydrogen production from water oxidation and proton reduction can include covalently attaching a ruthenium complex onto a conducting material is provided by fluorine-doping a carbon cloth (FCC) and use this as an anode and/or a cathode in an electrochemical cell. The electrode for use in electrochemical hydrogen production from water oxidation is achieved by that the electrode comprises a ruthenium complex covalently attached onto a conducting material having a pyridine linker with a —$CH_2$—$CH_2$ spacer unit. The system for electrochemical hydrogen production from water oxidation and proton reduction can include at least an electrochemical cell having two electrodes, an anode and/or a cathode, where the electrodes comprise a ruthenium complex covalently attached onto a conducting material, is achieved by that the conducting material is made by fluorine-doped carbon cloth (FCC).

10 Claims, 3 Drawing Sheets

(51) Int. Cl.
  *C25B 11/056*  (2021.01)
  *C25B 11/081*  (2021.01)
  *C25B 15/02*  (2021.01)

(56) References Cited

OTHER PUBLICATIONS

Li, F., et al., Immobilization of a molecular catalyst on carbon nanotubes for highly efficient electro-catalytic water oxidation, Chem. Commun., 2014, 50, 13948.

Hoque, M. A., et al., Water oxidation electrocatalysis using ruthenium coordination oligomers adsorbed on multiwalled carbon nanotubes, Nature Chemistry, vol. 12, Nov. 2020, 1060-1066.

Wu, Z., et al., Covalent immobilization of ruthenium polypyridyl complex on multi-walled carbon nanotube supports for oxygen evolution reaction in an alkaline solution, Journal of Power Sources, vol. 488, Mar. 15, 2021, 229448.

Panomsuwan, G. et al., Simple one-step synthesis of fluorine-doped carbon nanoparticles as potential alternative metal-free electrocatalysts for oxygen reduction reaction, J. Mater. Chem. A, 2015, 3, 9972.

Tong, L, et al., Oxygen evolution at functionalized carbon surfaces: a strategy for immobilization of molecular water oxidation catalysts, Chem. Commun., 2012, 48, 10025-10027.

Wu, L., et al., Crossing the bridge from molecular catalysis to a heterogenous electrode in electrocatalytic water oxidation, Proceedings of the National Academy of Sciences 116(23).

International Search Report for PCT/SE2022/000009, dated Feb. 16, 2023.

\* cited by examiner

SYSTEM, ELECTRODE AND METHOD FOR EFFICIENT HYDROGEN GENERATION FROM WATER

CROSS-REFERENCE TO RELATED APPLICATION

This application is a National Phase entry of International Application No. PCT/SE2022/000009, filed on Nov. 24, 2022, which claims priority to and the benefit of Sweden Application No. 2100177-1, filed on Nov. 26, 2021, the disclosures of which are incorporated herein by reference in their entirety.

FIELD OF THE INVENTION

The present invention relates to a system, an electrode, and a method for efficient water oxidation and where the invention is based on pyridyl anchoring of a ruthenium electrocatalyst on fluorinated carbon cloth for use as one or more electrodes in an electrochemical cell for hydrogen production.

BACKGROUND OF THE INVENTION

Hydrogen gas ($H_2$), a zero-carbon and renewable fuel, is expected to play a key role in solving fossil-fuel shortage and global warming in the near future, two major scientific challenges facing our society today.

Of the currently available technologies for the production of $H_2$, electrochemical generation of $H_2$ from water has shown the best potential in terms of reliability, commercial viability, and scope for further improvement. Consequently, much of the recent research efforts have been directed towards the development of durable and efficient systems for electrocatalytic water oxidation (WO), as the WO reaction currently constitutes the bottleneck in the overall process of making hydrogen gas ($H_2$) from water.

Strategically designed molecular catalysts and metal oxide/hydroxide based heterogeneous systems have been studied for efficient WO. Molecular catalysts offer an attractive alternative to known metal oxide and hydroxide-based electrodes, since they are associated with improved product selectivity and simpler optimization.

PRIOR ART

Prior art describes, in some articles, electrochemical cells for water oxidation and hydrogen production by immobilizing/anchoring ruthenium electrocatalysts on conductive substrates.

A first prior art, Chemical Communications, year 2014, vol 50, 13948-13951, describes the anchoring of a ruthenium catalyst on non-fluorinated carbon cloth using a 4-(Dodecyloxy)pyridine dicarboxylate linker.

In the present invention, a fluorinated carbon cloth and —$CH_2$—$CH_2$-pyridine linkers play a key role in the high performance of a particular electrode. The present invention further distances from this prior art article, in terms of the ruthenium electrocatalyst used and the process for grafting it onto the fluorinated carbon cloth substrate.

Another prior art, Proceedings of the National Academy of Sciences, year 2019, vol 116, 11153-11158, describes the immobilization of a ruthenium catalyst onto a completely different support material, i.e. nanostructured indium tin oxide.

The anchoring process in this prior art is also completely different from that of the present invention as it involves an olefin metathesis process (carbon-carbon double bonds are connected together between the support and the catalyst). Furthermore, while attached to their respective support, the catalyst of the present invention is not identical to the catalyst described in the prior art. The prior art involves a bipyridine and benzimidazole ligand without carboxylic acid functional groups, while the present invention uses a benzimidazole carboxylate as the central ligand backbone and pyridines as linkers.

And neither article describes a system where electrochemically regeneration of the electrodes is possible.

A common shortcoming of molecular electrocatalysts is their instability under oxidative-reductive environments in homogeneous conditions as well as when being immobilized onto electrically conducting materials, such as structurally modified fluorine-doped tin oxide, carbon cloth, graphene oxide, by strong TT-TT stacking interactions.

Another shortcoming of many state-of-the-art electrocatalysts and electrodes is that they do not allow regeneration of their electrocatalytic activity. This increases the overall cost for the electrolysis cell and greatly reduces their practical applicability.

The Main Objects of the Invention

The main object of the invention is to provide a method for producing new effective electrodes using molecular electrocatalyst and a conductive support for efficient water oxidation.

Another object of the invention is to provide a new type of an effective electrode, for water oxidation, comprising molecular electrocatalysts, that also may be used as an anode and/or a cathode.

A further object of the invention is to provide a system using a new molecular electrocatalyst for efficient water oxidation, and which makes electrochemical regeneration of the electrodes possible.

The above-mentioned and further objects and advantages are achieved according to the invention by a method defined in claims 1-4, an electrode according to claims 5-6, and a system according to claims 7-9.

BRIEF DESCRIPTION OF THE INVENTION

The present invention eliminates the disadvantages of the known prior art and refers to the design of an efficient hybrid system, an electrode, and a method for electrochemical water oxidation by covalently attaching a highly active ruthenium complex onto a conducting, fluorine-doped carbon cloth material using pyridine-based linkers including making regeneration of the electrodes possible electrochemically.

As ruthenium forms strong covalent bonds to N-donor ligands, pyridine-modified carbon cloth (PCC) constitutes an excellent conductive solid support in an electrode assembly.

The invention is described by the preparation of a new type of electrode with the potential to combine the advantages of molecular catalysts and heterogeneous conductive support materials.

In the invention, fluorinated carbon cloth (FCC) with an excellent oxidative resistance capability is modified by pyridine linkers (—$CH_2$—$CH_2$-pyridine) using a diazotization reaction strategy to obtain pyridine modified fluorine doped carbon cloth (PFCC), which in turn is used as a support for the anchoring of molecular electrocatalysts.

Further features and advantages of the invention will become apparent from the following, more detailed description of the invention, and from the accompanying drawings and claims.

BRIEF DESCRIPTION OF THE DRAWINGS

The invention is described in more detail below in the form of one or more preferred embodiments and with reference to the accompanying drawings.

DETAILED DESCRIPTION OF THE INVENTION AND ITS MOST IMPORTANT EMBODIMENT

The invention refers to the design of an efficient method for a hybrid electrode and system for electrochemical hydrogen production from water oxidation and proton reduction, where both the cathode and anode are a highly active ruthenium complex covalently attached onto a conducting, fluorine-doped carbon cloth material using a pyridine linker with a —$CH_2$—$CH_2$ spacer unit.

This is done by first modifying the fluorinated carbon cloth (FCC) with pyridine linkers using a diazotization reaction strategy to obtain PFCC, followed by using it as a support for the anchoring of the molecular electrocatalyst.

Figure 1:
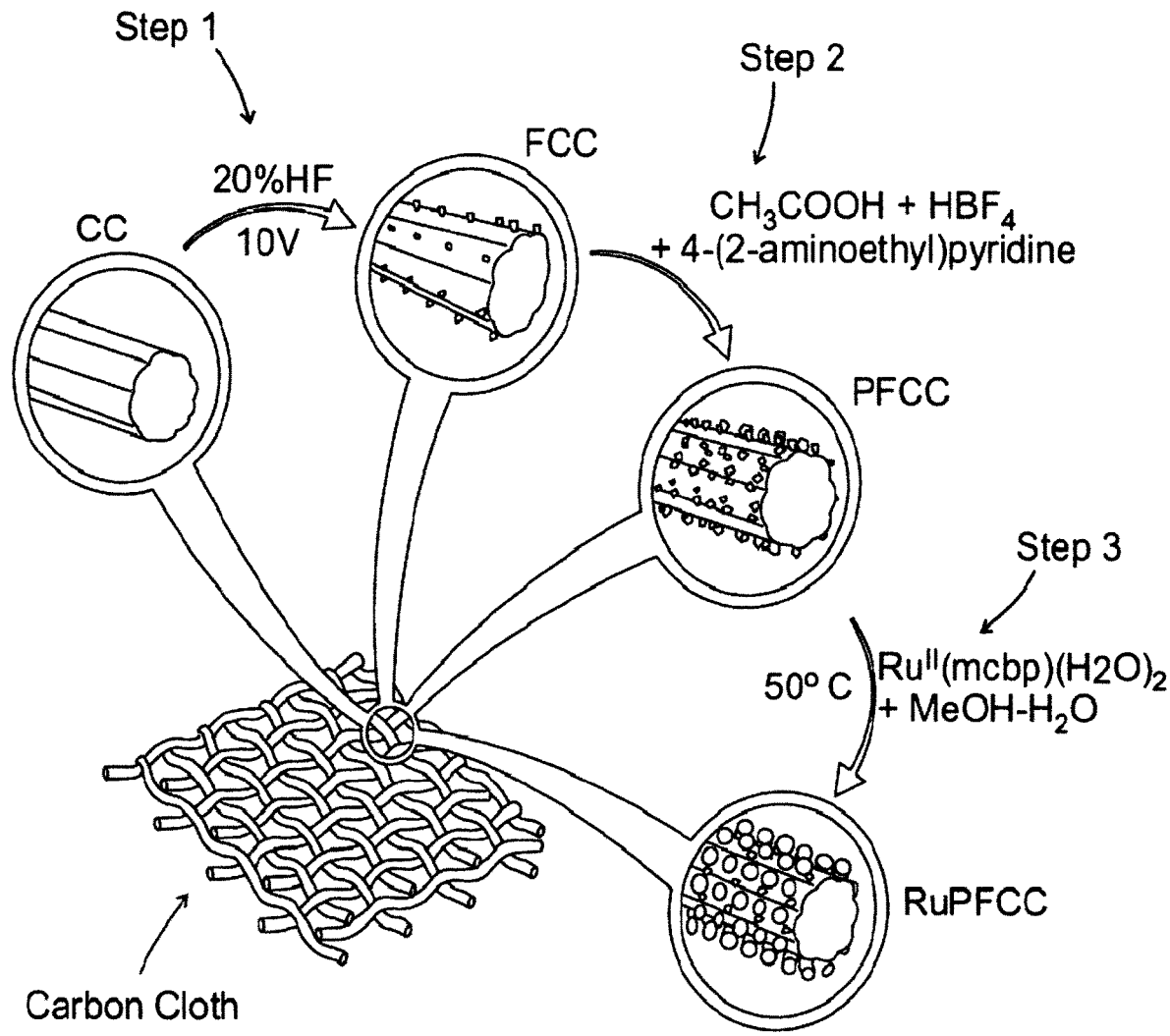
FIG. 1 shows the steps of a synthesis process of the hybrid assembly, which constitutes a new type of electrode consisting of a highly active ruthenium electrocatalyst anchored onto a robust fluorine-doped carbon cloth material by an appropriately sized pyridine linker.

FIG. 1 shows the synthetic method of the hybrid assembly, which is a new type of electrode consisting of a highly active ruthenium electrocatalyst [$Ru^{II}$(mcbp)($H_2O$)$_2$], anchored onto a robust fluorine-doped carbon cloth material by an appropriately sized pyridine linker.

Step 1: Carbon cloth (CC) is treated with preferably 20% HF and a potential of about 10 V to prepare the fluorine doped carbon cloth (FCC).

Step 2: FCC is treated with $HBF_4$, $CH_3COOH$, 4-(2-aminoethyl)pyridine and isoamyl nitrile under $N_2$ to graft the —$CH_2$—$CH_2$-pyridine to get pyridine modified fluorine doped carbon cloth (PFCC). The electrode surface is characterized by SEM, TEM, XPS, electrochemical impedance spectroscopy, thermogravimetric analysis and Raman spectroscopy before anchoring of the ruthenium catalyst.

Step 3: PFCC is dipped into a degassed MeOH: $H_2O$ solution of [$Ru^{II}$(mcbp)($H_2O$)$_2$ and is left in this solution for 5 h at 50° C. under continuous stirring and $N_2$ flow. The resulting electrode is washed with cold water to remove loosely bound catalysts, followed by drying overnight in an about 65° C. oven to obtain the final RuPFCC (ruthenium-containing pyridine modified fluorine doped carbon cloth) electrode. The electrode surface was characterized by SEM, TEM, XPS, electrochemical impedance spectroscopy, thermogravimetric analysis, and Raman spectroscopy.

This RuPFCC electrode combines the advantages of molecular catalysts and heterogeneous conductive support materials, and also enables regeneration of the electrocatalytic activity, which is very rarely seen for water oxidation electrodes and systems.

Figure 2:
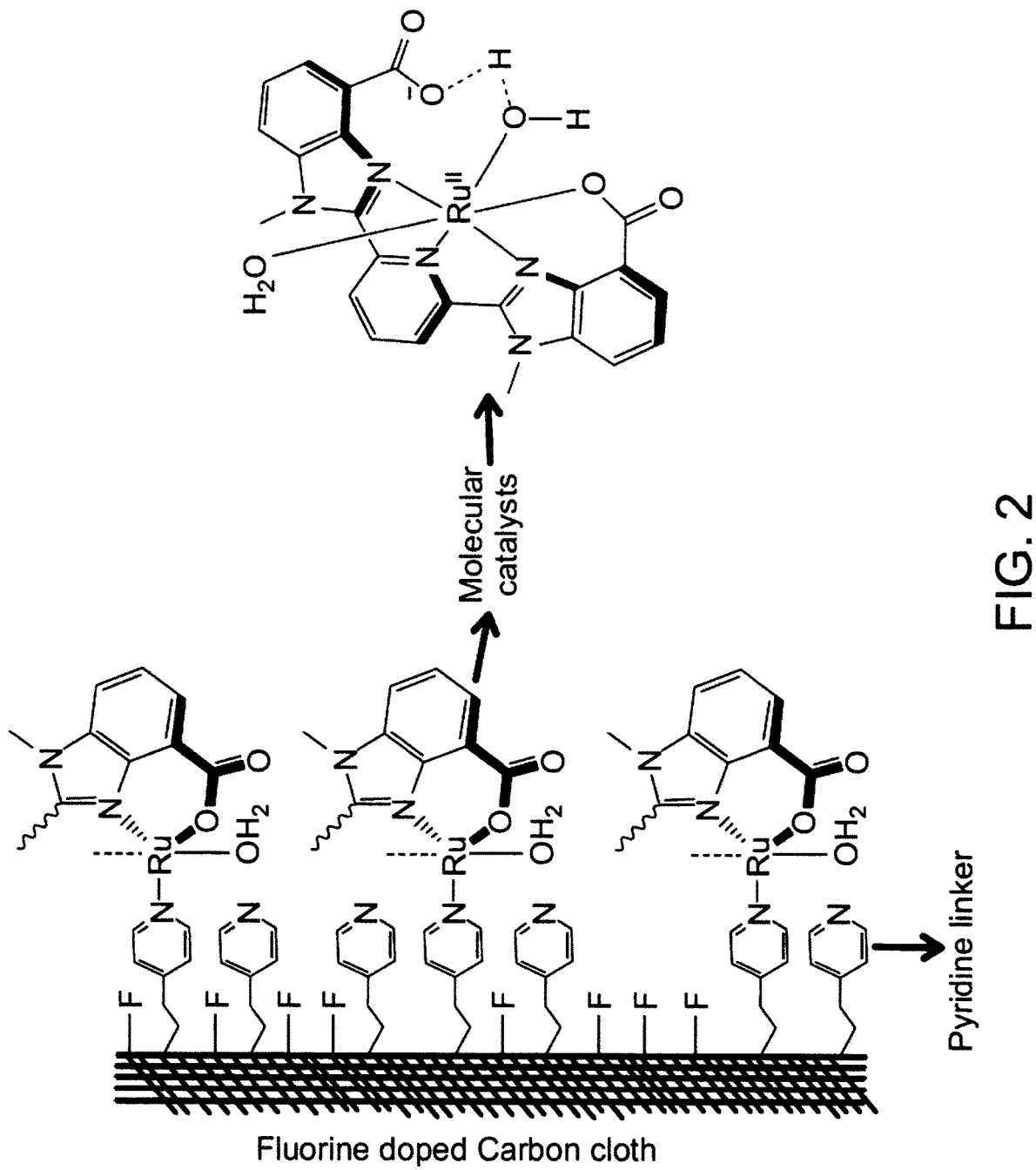
FIG. 2 shows in detail how the molecular catalyst with labile coordination ($H_2O$) sites is anchored onto the PFCC material through a strong Ru—N interaction.

FIG. 2 shows in detail how the molecular catalyst [$Ru^{II}$(mcbp)($H_2O$)$_2$] with labile coordination ($H_2O$) sites is anchored onto the PFCC material through a strong Ru—N interaction. Clear difference in conductivity was observed upon anchoring of the molecular electrocatalyst.

The resulting electrode (RuPFCC) has been evaluated as an anode for water oxidation and displayed high reactivity (TON>7×$10^3$) over a period of 48 h of continuous electrolysis at 1.4 V (vs NHE).

This electrode, according to the invention, makes it possible to regenerate up to about 98% of the electrocatalytic activity of the RuPFCC through electrochemical reduction. Even after 16 days of continuous oxidation and reduction experiments, it proved possible to recover up to about 74% of the activity of the RuPFCC electrode.

As an example of a catalyst with a $1^{st}$ row transition metal, the cobalt complex [$Co^{II}$(mcbp)($H_2O$)] was anchored to the fluorinated carbon cloth through pyridine linkers in the same way as RuPFCC to get CoPFCC (cobalt-containing pyridine modified fluorine doped carbon cloth electrode). The electrode surface was characterized by SEM, TEM, electrochemical impedance spectroscopy, thermogravimetric analysis and Raman spectroscopy. This robust electrode shows a TON of >3×$10^3$ for water oxidation over a period of 20 h, and close to 85% of the WO activity could be regenerated after 72 h of continuous oxygen evolution experiment. Although the WO reactivity of CoPFCC was lower than that of RuPFCC, similar regeneration of the electrochemical WO activity using $1^{st}$ row transition metal element is promising, and showcases the potential of the herein described method.

Figure 3:
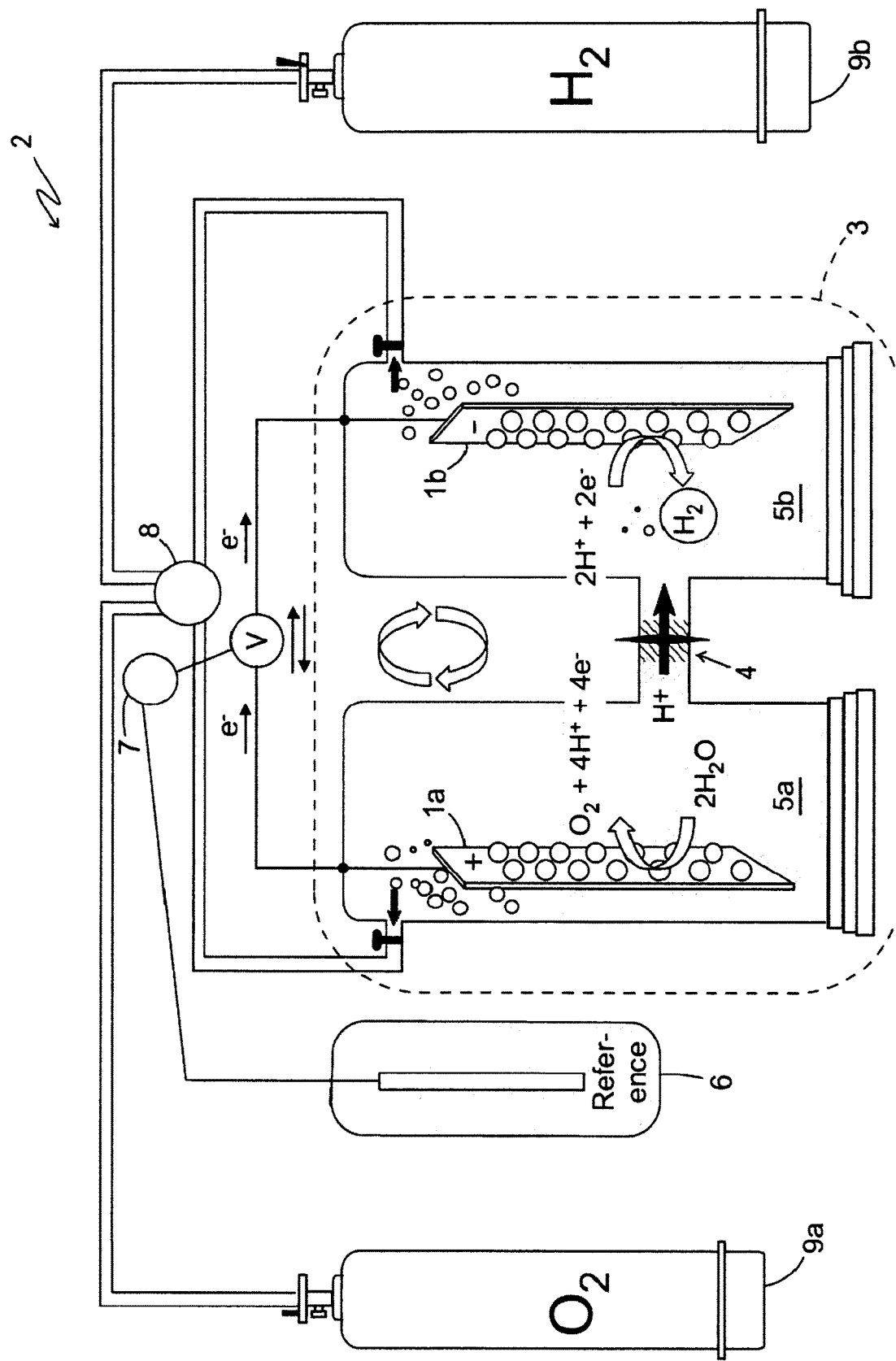
FIG. 3 shows a system, i.e. an electrochemical cell for water oxidation, which is designed based on the electrode technology according to the invention.

FIG. 3 describes a system for non-stop production of hydrogen gas ($H_2$) by utilizing the electrode assembly 1a,b, according to the invention, both for water oxidation (on the anode-side) and proton reduction (on the cathode-side) in an electrochemical cell 2.

The electrochemical cell 2 consists of a vessel 3 with the same Ru-catalyst anchored PFCC as the anode and cathode with an insulating membrane 4 between them, which only protons can penetrate. The insulating membrane 4 (e.g., Nafion 117) allows only proton to pass through from the anode to the cathode compartment 5a,b. To help applying an accurate potential to the working electrodes, a standard Ag—AgCl reference electrode 6 can be used.

A switch 7 is arranged to change the polarities of the electrodes 1a,b in order to regenerate electrodes 1a,b by reduction. The switch 7 may be of a three-way "electrical type" and allows continuous switching of the cathode and anode compartments 5a,b, i.e. switching of the two working electrodes 1a,b that produce $H_2$ and $O_2$, and make it possible to use the reduced anode as a cathode, which will electrochemically regenerate it so that it again can be used as an anode. Switching can be done manually or automatically by a simple control unit (not shown), in case of an industrial application.

This will thus enable continuous cycling and regeneration of the electrocatalytic activity of the electrodes 1a,b and the production of $H_2$.

Another switch 8 arranged in the connection pipes of the system may be used to change the collection of $H_2$ from the previous $O_2$-generation electrode compartment 5a,b and $O_2$ from the previous $H_2$-generation electrode compartment 5a,b. This switch may be of a "mechanical type" and will regulate the direction of the gas flow to different gas storages 9a,b, such as cylinders, during electrocatalysis and regeneration. This will allow $H_2$ and $O_2$ to be continuously collected in the respective cylinders. For industrial use, standard compressors for the gases ($H_2$ and $O_2$) should be installed.

The invention may be further modified and be used to reduce $H^+$ as well as $CO_2$ in the cathode compartment 5b to produce both gaseous ($H_2$, $CH_4$ etc.) and liquid (HCOOH, $CH_3OH$, etc.) fuels.

Some Special Characteristics and Advantages of the Invention are:
 (i) Fluorine-doped carbon cloth (FCC) is a highly robust conductive support for the anchoring of molecular electrocatalysts.
 (ii) Anchoring pyridine to carbon cloth through covalent C—C bonds with two —$CH_2$ units allow for the optimal distance between the conductive surface and the molecular catalyst.
 (iii) The pyridine units of —$CH_2$—$CH_2$-pyridine linkers provide strong covalent bonding interaction with the ruthenium center.
 (iv) The hybrid electrode (RuPFCC), containing a ruthenium-based molecular catalysts anchored to pyridine-modified FCC, is designed to combine advantages from the molecular counterpart as well as the conductive support (i.e. combining the advantages of both homogeneous and heterogeneous systems).
 (v) The special design of the cell is arranged to regenerate the electrocatalytic activity of the electrodes with continuous production of hydrogen.
 (vi) With a similar strategy, electrodes can be prepared using cheap and 1st row transition metals, such as iron, cobalt, nickel, copper, and manganese. The cobalt analogue (CoPFCC) is an example.

Experimental Description

Preparation of FCC: Commercially procured ACC was modified by electrochemical route in HF solution, using a protocol from Electrochimica Acta, year 2020, volume 358, article ID: 136939. Pieces of 5 cm×5 cm of carbon cloth (CC) were first cleaned in isopropanol and water in a sonication bath for 30 min. Then, the cleaned CC was immersed in 300 ml 20% HF solution as working electrode and graphite foil as counter electrode. An external potential of 10 V was applied for 15 min. The as prepared cloth was washed with water repeated times until pH 6 was reached and then the samples were dried overnight at 60° C.

Preparation of pyridine modified fluorine doped carbon cloth (PFCC): A 1.5 cm×3 cm FCC was kept in a 60° C. oven for 4 h before immersing into glacial $CH_3COOH$ (5 mL) under nitrogen, followed by stepwise addition of degassed $HBF_4$ (0.5 mL 48% in $H_2O$) and of 4-(2-aminoethyl)pyridine (0.5 mL, 95%). The colorless solution turns bright orange upon the addition of 4-(2-aminoethyl)pyridine. The system was kept under continuous stirring and a high flow of nitrogen for 5 minutes before the dropwise addition of 0.5 ml of isoamyl nitrite, following a protocol reported in Journal of American Chemical Society, year 2017, volume 139, 11760-11765.

The color of the solution changes to pale yellow and effervescence was observed especially around FCC. The reaction mixture was kept under a high flow of nitrogen until the effervescence was ceased. The resulting solution was decanted out and the electrode was washed with 5×10 ml of water, followed by drying overnight in a 60° C. oven resulting in PFCC, new conductive support for molecular electrocatalysts. IR, Raman, TGA, SEM and XPS spectral analysis were used to illustrate PFCC composition before anchoring the ruthenium catalyst.

Preparation of [$Ru^{II}$(mcbp)($H_2O$)$_2$] (1): $H_2$mcbp ligand for the catalyst [$Ru^{II}$(mcbp)($H_2O$)$_2$] (1) was prepared following a reported procedure in ChemSusChem, year 2019, volume 12, 2251-2262. A EtOH/$H_2O$ (4:1) solution (25 mL) of $H_2$mcbp (0.2 g, 0.47 mmol) and of Ru (DMSO)$_4$Cl$_2$ (0.23 g, 0.47 mmol, 1 equiv.) was degassed (by $N_2$) for a period of 5 min before adding degassed Et3N (1.41 mmol, 0.2 mL, 3 equiv.). The resulting solution was refluxed at 80° C. for a period of 5 h. The color change from yellow to dark brown upon heating indicated complexation. The solution was filtered and kept in the fridge over night to get brown precipitate. The precipitate was collected and washed with ice cold ethanol and diethyl ether to get brown powder of 1. It was dried overnight under vacuum and characterized by HRMS and NMR spectroscopy before anchoring to PFCC. The existence of water molecules in the structure is supported by the temperature dependent NMR, ESI-MS and UV-Vis spectroscopic analysis. 1H NMR (CD$_3$OD): δ 8.54 (d, J=8.2 Hz, 2H), 8.20 (t, J=8.2 Hz, 1H), 8.03 (dd, J=8.4 and 0.7 Hz, 2H), 8.01 (dd, J=7.4 Hz, 0.7 Hz, 2H), 7.71 (dd, J=8.4 Hz, 7.4 Hz, 2H), 6.90 (s, 1H), 6.61 (s, 1H), 4.54 (s, 6H, —$CH_3$ protons). ESI-HRMS in MeOH:

Calculated for [$Ru^{II}$(mcb) Na]$^+$ m/z 550.0066 ($C_{23}H_{15}N_5O_4RuNa^+$), and experimental m/z 550.0039.

Preparation of [$Ru^{II}$(Mcbp)($H_2O$)] anchored PFCC (RuPFCC):

A 1.5 cm×3 cm PFCC was dipped into a degassed 10 ml of MeOH: $H_2O$ (4:1) solution of 0.05 M of 1 and left in the solution for 5 h at 50° C. under continuous stirring, followed by washing with cold water (2×5 mL) to remove the loosely bound catalysts on the PFCC surface. The resulting electrode was dried overnight in a 65° C. oven to get RuPFCC. The surface was characterized by IR, Raman, TEM, TGA, SEM and XPS spectroscopy.

The description above is primarily intended to facilitate the understanding of the invention and the scope of protection is NOT limited to the embodiments described herein, as other variants and embodiments of the invention are fully possible and conceivable within the scope of the inventive concept and the scope of the following claims.

The invention claimed is:

1. A method for electrochemical hydrogen production from water oxidation and proton reduction by covalently attaching a ruthenium complex onto a conducting material, comprising fluorine-doping a carbon cloth to provide a fluorinated carbon cloth (FCC) and using the FCC as at least one of an anode and a cathode in an electrochemical cell.

2. The method according to claim 1, further comprising modifying the fluorinated carbon cloth (FCC) with pyridine linkers.

3. The method according to claim 1, further comprising modifying the fluorinated carbon cloth (FCC) with pyridine linkers having a —$CH_2$—$CH_2$ spacer unit.

4. The method according to claim 1, further comprising using the fluorinated carbon cloth (FCC) comprising pyridine linkers provided by a diazotization reaction strategy to obtain pyridine modified fluorine doped carbon cloth (PFCC), which is then used to anchor the ruthenium complex.

5. An electrode for use in electrochemical hydrogen production from water oxidation, wherein the electrode comprises a ruthenium complex covalently attached onto a conducting material, wherein the conducting material comprises a fluorine-doped carbon cloth (FCC).

6. The electrode according to claim 5, wherein the ruthenium complex is covalently attached to the fluorine-doped carbon cloth (FCC) via pyridine linkers having a —$CH_2$—$CH_2$ spacer unit.

7. The electrode according to claim 6, wherein the pyridine linkers are provided by a diazotization reaction strategy to obtain pyridine modified fluorine doped carbon cloth (PFCC), which then constitutes a support for anchoring of the ruthenium complex.

8. A system for electrochemical hydrogen production from water oxidation and proton reduction, comprising at least an electrochemical cell having two electrodes, at least one of an anode and a cathode, where the electrodes comprise a ruthenium complex covalently attached onto a conducting material, wherein the conducting material is made of fluorine-doped carbon cloth (FCC).

9. The system according to claim 8, wherein a switch is arranged to change polarities of the electrodes in order to regenerate the electrodes by reduction.

10. The system according to claim 8, wherein a switch is arranged to change collection of $H_2$ from a previous $O_2$-generation electrode compartment and $O_2$ from a previous $H_2$-generation electrode compartment.

\* \* \* \* \*